US006492005B1

(12) United States Patent
Ohbayashi et al.

(10) Patent No.: US 6,492,005 B1
(45) **Date of Patent: *Dec. 10, 2002**

(54) INK JET RECORDING SHEET

(75) Inventors: Keiji Ohbayashi, Tokyo (JP); Osamu Hatano, Tokyo (JP); Kenzo Kasahara, Tokyo (JP)

(73) Assignee: Konica Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/518,777

(22) Filed: Mar. 3, 2000

(30) Foreign Application Priority Data

Mar. 9, 1999 (JP) ........................................ 11-061696
Mar. 19, 1999 (JP) ........................................ 11-075692

(51) Int. Cl.[7] ........................................ B32B 3/00
(52) U.S. Cl. ........................................ 428/195
(58) Field of Search ........................................ 428/195

(56) References Cited

U.S. PATENT DOCUMENTS 4,771,032 A * 9/1988 Yamaguchi et al. ........ 503/201
5,786,100 A * 7/1998 Tsuruoka et al. ........... 428/511
6,054,223 A * 4/2000 Tsuchiya et al. ......... 428/478.2
6,110,585 A * 8/2000 Shaw-Klein ................ 428/341
6,153,305 A * 11/2000 Uemura et al. .......... 428/478.2
6,156,389 A * 12/2000 Brown et al. ............ 427/393.4
6,228,475 B1 * 5/2001 Chu et al. ................ 428/304.4
6,277,476 B1 * 8/2001 Shaw-Klein et al. ........ 428/195

FOREIGN PATENT DOCUMENTS

EP 0634283 1/1995
EP 0764546 3/1997

OTHER PUBLICATIONS

European Search Report EP 00 30 1878.

Patent Abstracts of Japan, Publication # 60049990, Publication date: Mar. 19, 1985.

Patent Abstracts of Japan, Publication # 10166713, Publication date: Jun. 23, 1998.

Patent Abstracts of Japan, Publication # 09254529, Publication date: Sep. 30, 1997.

* cited by examiner

*Primary Examiner*—Bruce H. Hess
*Assistant Examiner*—Kimberly T. Nguyen
(74) *Attorney, Agent, or Firm*—Bierman, Muserlian and Lucas

(57) ABSTRACT

An ink jet recording sheet is disclosed. The recording sheet comprises a water non-absorptive support and a porous ink absorptive layer comprising dicyandiamide polycondensation product on the support.

12 Claims, No Drawings

INK JET RECORDING SHEET

FIELD OF THE INVENTION

The present invention relates to an ink jet recording sheet (hereinafter occasionally referred to as a recording sheet) and its production method, and specifically to an ink jet recording sheet which exhibits improved water resistance as well as improved light fastness, and its production method.

BACKGROUND OF THE INVENTION

In recent years, the image quality of ink jet recording has rapidly improved and has approached that of conventional photography. In order to realize such conventional photographic quality employing ink jet recording, improvements have been carried out in the area of the recording sheet. As a result, a recording sheet, which is comprised of a highly smoothened surface support having thereon a layer comprising minute voids, has been developed, and due to its excellent ink absorbability as well as ink drying properties, has become one of the recording sheets which are capable of producing images closest to that of conventional photography.

Accompanying such achievement of high quality image, still higher quality has been demanded for recording sheets. Specifically, an ink jet recording sheet, which is comprised of a water non-absorptive support having thereon an ink absorptive layer, is preferably employed, since it is capable of producing high quality prints due to its ability to maintain high smoothness during ink jet recording.

Further, in the ink jet recording, water-soluble dyes are commonly employed as colorants, and such water-soluble dyes are highly hydrophilic. Therefore, when recorded images are stored at high humidity for an extended period of time after recording, or a drop of water comes into contact with the recorded surface, the dyes tend to bleed.

In order to solve these problems, it is a general practice that dye-fixing materials are incorporated into the image receptive layer. Listed as such dye fixing-agent is a cationic fixing-agent such as inorganic pigment (fine alumina particles and the like) having a cationic surface, cationic polymer having quaternary ammonium bases in their molecules, and the like.

On the other hand, in ink jet recording, water-soluble dyes are commonly employed as colorants, and such water-soluble dyes are highly hydrophilic. Therefore, when recorded images are stored at high humidity for an extended period of time after recording, or a drop of water comes into contact with the recorded surface, the dyes tend to bleed. In order to solve these problems, it is a general practice that dye-fixing materials are incorporated into the image receptive layer. Listed as such dye-fixing agents are inorganic pigments (fine alumina particles and the like) having a cationic surface, cationic polymers having quaternary ammonium bases in their molecules, and the like.

The fine alumina particles themselves exhibit high dye fixability and are capable of converting an ink absorptive layer to a void layer, by using a small amount of binders (polyvinyl alcohol and the like). However, since the material cost is relatively high, it is not advantageously used in production of less expensive recording sheets.

On the other hand, cationic copolymers having the quaternary ammonium bases in their molecules, when used with various types of fine particles, are capable of providing water resistance to a void layer type ink absorptive layer.

When said cationic materials are incorporated into the porous layer, said disadvantage tends to be more marked. In addition, results of investigation performed by the present inventors have revealed that such a problem tends to occur in the areas where air is easily circulated.

Conventionally, it has been well known that antioxidants effectively minimize photofading in which oxygen is involved. However, according to the investigation results of the present inventors, photofading of images, which are recorded using a water-soluble phthalocyanine based dye on an ink jet recording sheet comprising a water non-absorptive support having thereon a void layer, has not been effectively minimized.

When added to an ink jet recording sheet, almost all compounds, which have been found to be effective, exhibit relatively sufficient minimization of photofading during the initial period of time. However, the effects tend to gradually decrease, over time, and photofading over a relatively long period of time, in which oxygen is involved, has not been satisfactorily minimized.

In order to improve the degradation of such light fastness, a number of proposals have been made regarding the addition of UV absorbers as well as various types of antioxidants.

However, the addition of such compounds to an ink jet recording sheet, comprising a void layer having high oxygen permeability, has resulted in unsatisfactory effects. When a large amount of various types of such fading resistant additives is added in order to obtain sufficient minimization of photofading, the ink absorbability of the void layer is markedly decreased.

In addition, conventional fading resistant additives surely exhibit effects during the initial period of time, when exposed to light. However, a problem occurs in which the effects are gradually lost when continually exposed to light.

Specifically, when a cationic polymer having quaternary ammonium bases in its molecule is employed, such problems are increased. Accordingly, it is sought that water resistance as well as light fastness be improved while the ink absorption rate is not adversely affected.

When the cationic polymer is employed, the degradation of light fastness is accelerated due to the void layer, and this cause has not been yet clarified. However, it is assumed that dyes tends to be fixed in a more upper layer, that is, a surface and to suffer the effects of oxygen.

Japanese Patent Publication No. 2-35675 describes an ink jet recording sheet in which light fastness is improved employing polyalkylenepolyamine-dicyandiamide ammonium salt condensation products as the cationic resin. Further, Japanese Patent Publication Open to Public Inspection No. 9-254529 describes an ink jet recording sheet which employs polyalkylenepolyamine-dicyandiamide condensation products comprising no quaternary ammonium salt structure, resulting in minimized yellow staining on the white background as well as minimized fading is minimized and improved water resistance.

When an ink absorptive layer is comprised of a void layer, during ink jet recording, uniform images without unevenness are obtained due to excellent ink absorbability. On the contrary, however, oxygen permeability is large due to the porous layer, and after image recording, images tend to fade due to light.

Specifically, when recording is carried out employing an ink jet recording sheet comprising a water non-absorptive support having thereon a porous ink absorptive layer, while employing a water based ink comprising water-soluble copper phthalocyanine as the ink colorant, it has been discovered that problems occur in which photofading tends to be accelerated depending on the ambient conditions.

The present inventors have diligently investigated this aspect and have discovered the following. Ink comprises low volatile, high boiling point organic solvents (diethylene glycol, glycerin, and the like) in an amount of about 30 percent by weight. Further, in said ink, the concentration of phthalocyanine based dye is relatively low (specifically, no more than about one percent by weight). When recording is carried out employing an ink jet recording sheet comprising a water non-absorptive support having thereon an ink absorptive layer, while employing the aforementioned ink, noticeable photofading of the copper phthalocyanine based dyes tends to occur.

Furthermore, it has been discovered that said photofading is dependent on the ambient conditions, especially humidity, and the higher the temperature, the more fading occurs. Investigation results indicated that oxygen also adversely affects said fading.

In the ink jet recording sheets described in said patent publications, only those employing water absorptive supports are described. The investigation results by the present inventors have shown that in water adsorptive supports employing such polyalkylenepolyamine-dicyandiamide based polycondensation products (that is, a recording sheet in which a support absorbs ink solvents), fading resistant effects are not evident for phthalocyanine based dyes. It is assumed that such results are obtained due to the fact that when a water absorptive support, such as paper, is employed, oxygen penetrates from the rear surface of the ink absorptive layer, oxygen readily passes through the support due to voids having larger diameter, and thus fading resistant effects are not obtained.

In the ink jet recording sheets described in the aforementioned patent publications, a large amount of said compound is added to obtain sufficient water resistance, so that the ink absorption rate decreases in any case, and specifically, in high speed ink jet recording in recent years, uneven images tend to be produced.

SUMMARY OF THE INVENTION

Accordingly, an object of the present invention is to provide an ink jet recording sheet which exhibits improved water resistance as well as improved light fastness while the ink absorption rate is not adversely affected, and a production method of the same.

Another object of the present invention is provide an ink jet recording sheet which exhibits improved light fastness when an ink jet recording sheet comprising a water non-absorptive support having thereon a porous ink absorptive layer is subjected to ink jet recording employing a water-based ink comprising, particularly, a copper phthalocyanine based water-soluble dye.

The ink jet recording sheet of the present invention and its embodiments are described below.

An ink jet recording sheet comprising a water non-absorptive support having thereon a porous ink absorptive layer comprising dicyandiamide polycondensation product.

An ink jet recording sheet comprising a water non-absorptive support having thereon a porous ink absorptive layer comprising polyalkylenepolyamine-dicyandiamide polycondensation product.

The porous ink absorptive layer preferably comprises a cationic fixing-agent having quaternary ammonium bases in its molecule.

The preferable example of the cationic fixing-agent is a cationic polymer.

The other preferable example of the cationic fixing-agent is a silane coupling agent.

The porous ink absorptive layer preferably comprises boric acids or its salt.

The porous ink absorptive layer preferably comprises water-soluble polyvalent metal ion.

The porous ink absorptive layer preferably comprises a water-soluble reducing agent.

The porous ink absorptive layer preferably comprises a sulfur-containing compound.

The porous ink absorptive layer preferably comprises a hydrophobic antioxidant.

The hydrophobic antioxidant is preferably emulsified dispersion.

The porous ink absorptive layer preferably comprises a latex-based polymer.

DETAILED DESCRIPTION OF THE INVENTION

The present invention will be detailed below.

The water-soluble cationic polymers having quaternary ammonium bases in their molecules are water-soluble ones having quaternary ammonium bases in the polymer's main chain or side chain, and those known in the art are employed in the ink jet recording sheet. However, in the present invention, from the viewpoint of improvements in light fastness as well as water resistance of the ink jet recording sheet, water-soluble cationic polymers having a quaternary ammonium base in the side chain are particularly preferred.

Listed as examples of polymers having an ammonium base in the polymer main chain are epichlorohydrin-dimethylamine addition polymerization products, dimethylaniline ammonium chlodide-$SO_2$ copolymerization products, dimethylaniline ammonium chloride polymerization products, and the like.

Listed as water-soluble cationic polymers, having a quaternary a imonium base in the polymer side chain, are polyalkylamine salt polymerization products or water-soluble polymers having repetition units represented by the general formulas (1) or (2) shown below.

General Formula (1)

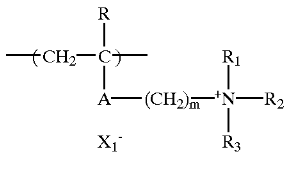

General Formula (2)

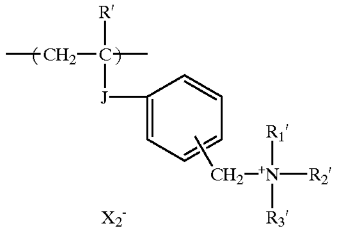

-continued

Formula (1)

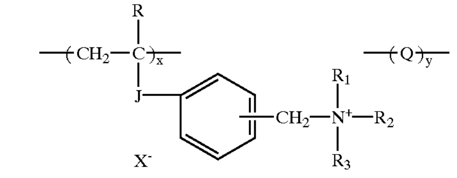

In the formula R and R' each represents a hydrogen atom or an alkyl group having 1 to 4 carbon atoms, $R_1$, $R_2$, $R_3$, $R_1'$, $R_2'$, and $R_3'$, each independently represents an alkyl group, and, A and J each represents a divalent bonding group. $X_1^-$ and $X_2^-$ represents an anion.

In the general formulas (1) and (2), practically R and R' each represents a hydrogen atom or an alkyl group having from 1 to 4 carbon atoms, and is preferably a hydrogen atom or a methyl group.

$R_1$, $R_2$, $R_3$, $R_1'$, $R_2'$, and $R_3'$ leach independently represents an alkyl group, and each is preferably a methyl group or an ethyl group. Each of these alkyl groups may have a substituent.

A and J each represents a divalent bonding group. A is preferably a simple bonding group or —CONH— or —COO—. J preferably represents a simple bonding group or —CON(R") (R" represents a hydrogen atom or an alkyl group which may have a substituent) as the organic group.

$X^-$ represents an anion (a halogen ion, a methyl sulfate ion, a p-toluenesulfonate ion, etc.).

Preferred as water-soluble cationic polymers, having quaternary ammonium bases in their molecule, are those having repetition units represented particularly by the aforementioned general formula (1) or formula (2). They may be either homopolymers comprised of the repetition units represented by the general formula (1) or (2), or copolymers with repetition units comprising no quaternary ammonium bases.

Further, the repetition units having quaternary ammonium bases may include both repetition units represented by the general formulas (1) and (2). Still further, they may include at least two of each of the repeat units represented by the general formula (1) or (2).

Listed as monomers employed as repetition units having no quaternary ammonium bases, which are copolymerized with those represented by the general formula (1) or (2), are, for example, styrene, butadiene, methyl methacrylate, ethyl methacrylate, butyl methacrylate, methyl acrylate, ethyl acrylate, butyl acrylate, 2-ethylhexyl acrylate, 2-ethylhexyl methacrylate, hydroxyl ethyl methacrylate, vinyl acetate, vinyl ether, acrylamide, N-methylacrylamide, N-butylacrylamide, N-vinylimidazole, 4-vinylpyridine, N-vinylpyrrolidone, and the like.

When the aforementioned water-soluble polymers are copolymers, the content ratio of repetition units represented by the general formula (1) or (2) is preferably between 20 and 100 mole percent, and is most preferably between 30 and 100 mole percent.

The aforementioned water-soluble cationic polymers having quaternary ammonium bases are soluble in water due to the presence of the quaternary ammonium bases. However, depending on the composition of monomers having no quaternary ammonium base, which are subjected to copolymerization, or the ratio of copolymers, the resulting polymers may be not be soluble in water. However, as long as they are soluble in a solvent mixture of water and water miscible organic solvents, they may be employed in the present invention.

Water miscible organic solvents as described herein mean organic solvents which are soluble in water commonly in an amount of at least 10 percent, and such organic solvents include alcohols such as methanol, ethanol, isopropanol, n-propanol and the like; glycols such as ethylene glycol, diethylene glycol, glycerin, and the like; esters such as ethyl acetate, propyl acetate, and the like; ketones such as acetone, methyl ethyl ketone, and the like; amides such as N,N-dimethylformamide and the like. In this case, the employed amount of organic solvents is preferably no more than that of water.

Specific examples of water-soluble cationic polymers having quaternary ammonium bases in their molecules are illustrated below. However, the present invention is not limited to these examples.

P-1

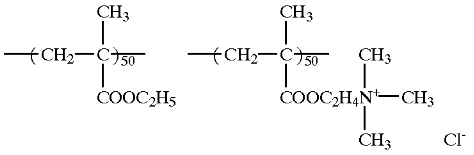

P-2

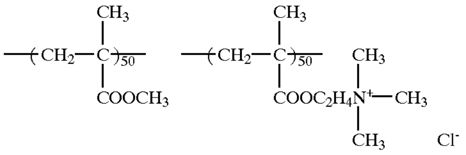

P-3

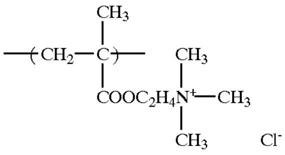

P-4

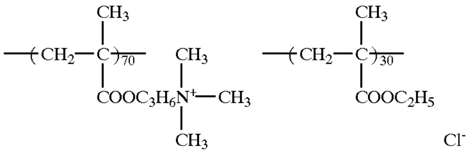

P-5

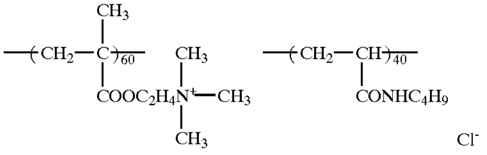

-continued
P-6
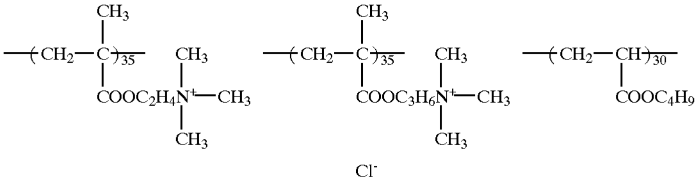
P-7
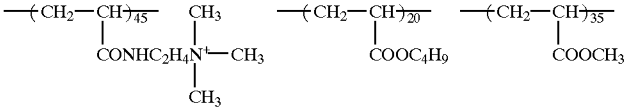
P-8
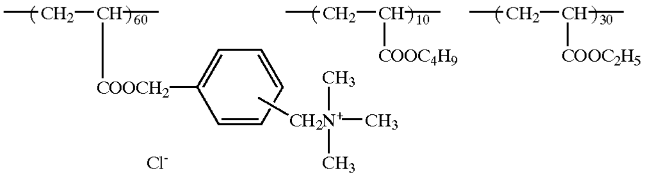
P-9
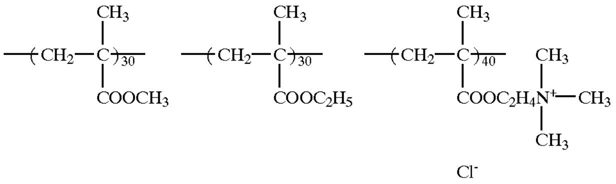
P-10
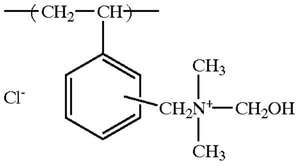
P-11
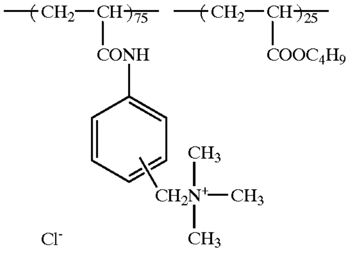
P-12
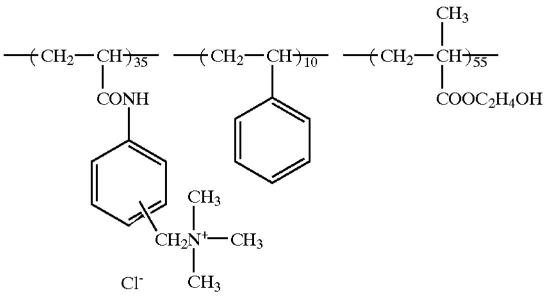
P-13
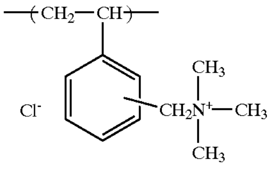
P-14
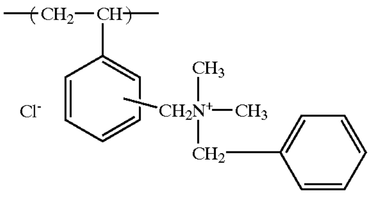
P-15
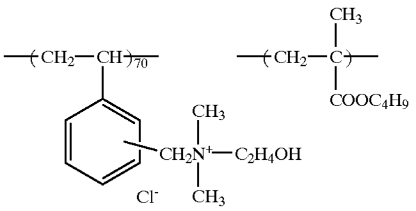

-continued
P-16
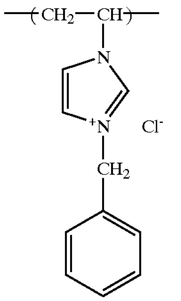
P-17
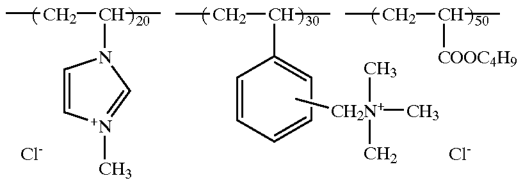
P-18
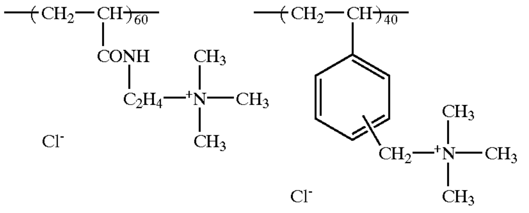
P-19
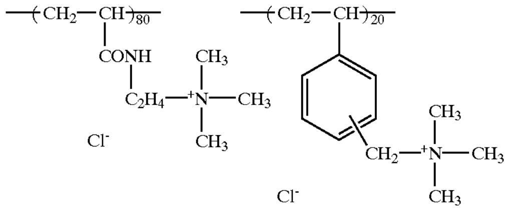
P-20
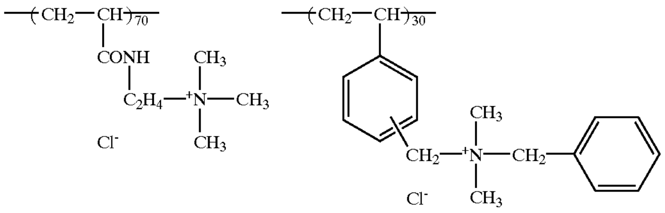
P-21
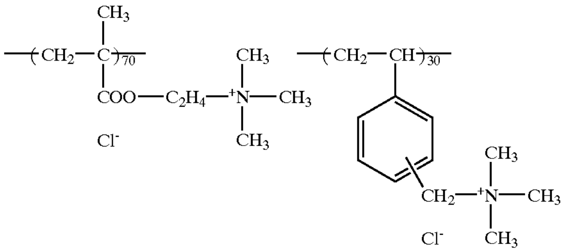
P-22
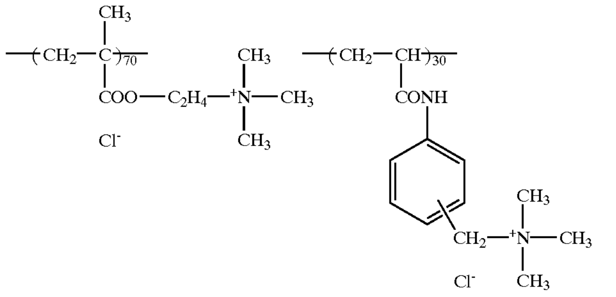
P-23
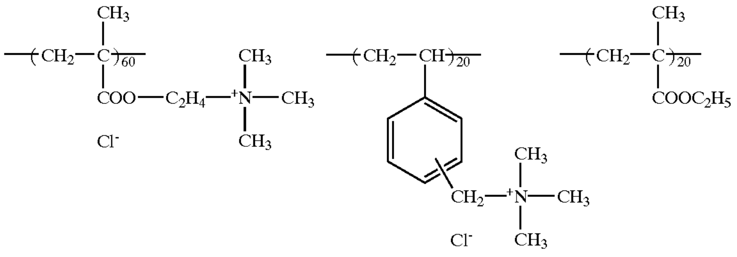
P-24
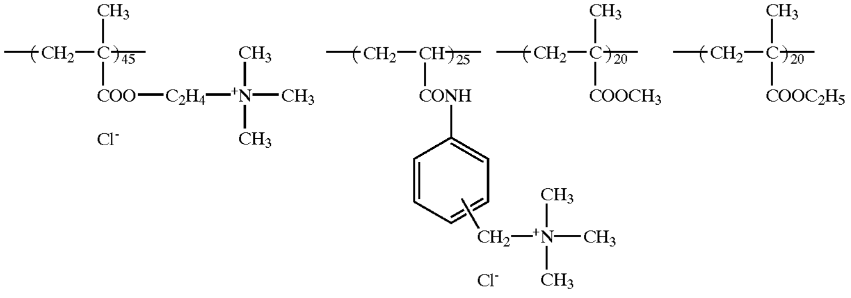

-continued

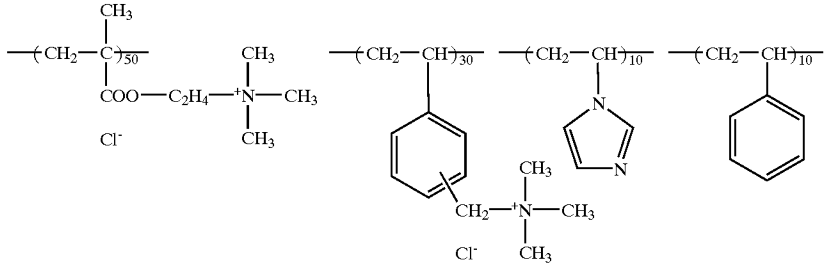

P-26

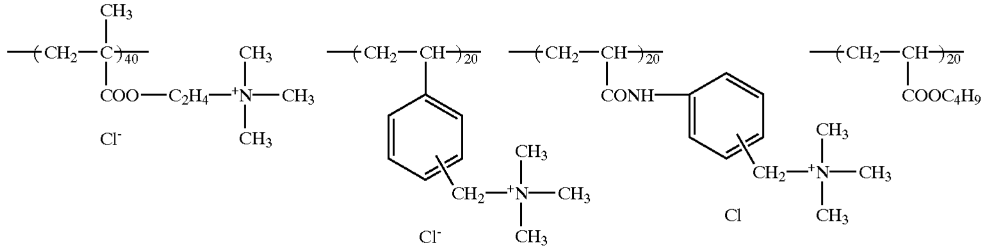

P-27

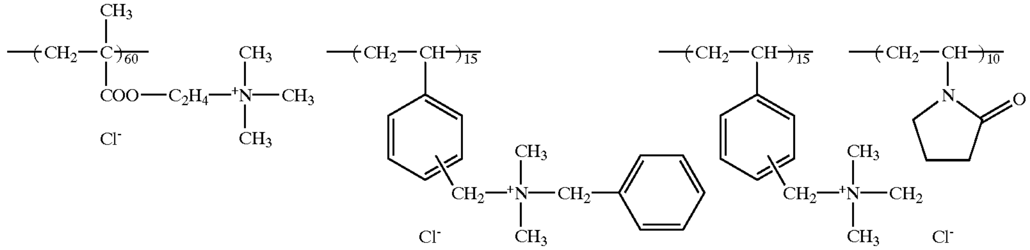

P-28

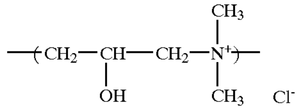

P-29

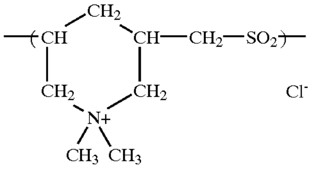

P-30

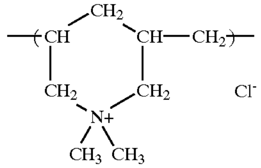

The number average molecular weight of the aforementioned cationic polymers is preferably between 2,000 and 100,000, and is most preferably between 3,000 and 80,000.

The dicyandiamide based polycondensation products as employed in the present invention are polycondensation products comprised of monomers having dicyandiamide as a partial structure. Listed as representative examples are polyalkylenepolyamine-dicyandiamide based polycondensation products which are polycondensation products between polyalkylenepolyamine and dicyandiamide, formalin-dicyandiamide based polycondensation products which are polycondensation products obtained by allowing formalin to react with dicyandiamide through a methylol forming reaction, and the like. Of these, in the present invention, specifically polyalkylenepolyamine-dicyandiamide based polycondensation products may be preferably employed.

The polyalkylenepolyamine-dicyandiamide based polycondesnatin products of the present invention are polycondensation types of polyalkylenepolyamine with dicyandiamide. Polyalkylenepolyamines include diethylenetriamine, triethylenetetraamine, tetraethylenepentaamine, aminobispropylamine, and chlorides, sulfates, and acetates thereof.

Various types of polyalkylenepolyamine-dicyandiamide polycondensation products are commercially available. They include, for example, Neofix RP-70, Sunfix 414 (manufactured by Meisei Kagaku Kogyo), (Neofix PNF-70, and Neofix E-117 (those above manufactured by Nikka Kagaku Co.), Parafix EP (manufactured by Ohara Palladium Kagaku Co.), Daiazinfix 400 (manufactured by Nissei Kagaku Co.), Fastgen P-708 (Tokaiseiyu Kogyo Co.), Jetfix 20 (manufactured by Kuroda Kako Co.), Kayafix M (manufactured by Nihon Kayaku Co.), PAP-1 (manufactured by Nihon Senka Kogyo Co.), and the like.

The added amount of polyalkylenepolyamine-dicyandiamide based polycondensation products is between about 0.01 and 5 g per $m^2$ of the recording sheet, and is preferably between 0.1 and 2 g.

The ink jet recording sheet of the present invention comprises a water non-absorptive support having thereon a porous ink absorptive layer. Conventionally a number of methods have been known which form said porous ink absorptive layer. Specifically, however, the porous ink absorptive layer is preferably comprised of a void layer composed of inorganic pigments and a small amount of hydrophilic binders.

The formalin-dicyandiamide based polycondensation products of the present invention are ones which are obtained employing a methylol reaction of formalin with dicyandiamide.

The ink jet recording sheet of the present invention may be applied to either a wet type ink jet recording sheet in which the ink absorptive layer provided on a support comprises hydrophilic binders, and during ink jet recording, said ink absorptive layer swells and accommodates ink, or a void type ink jet recording sheet in which the ink absorptive layer forms a void layer comprising inorganic pigments as well as a small amount of hydrophilic binders.

In recent years, however, high ink absorbability has been increasingly sought, and specifically, a void type ink absorptive layer is preferred from the viewpoint of image quality, drying properties after recording or water resistance of the layer.

Further, the support itself preferably exhibits excellent water resistance. The support, which exhibits excellent water resistance, is generally a non-porous support. When an ink absorptive layer having a void structure is provided on said support, the marked effects of the present invention are realized.

The particularly preferable void type ink absorbing layer is described below.

The ink-absorptive layer is a void type ink absorbing layer comprised of a hydrophilic binder and fine inorganic particles.

Listed as examples of fine inorganic particles can be white inorganic pigments such as soft calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthesized amorphous silica, colloidal silica, alumina, colloidal alumina, pseudoboehmite, aluminum hydroxide, lithopone, zeolite, magnesium hydroxide, etc.

Primary particles without any treatment may be employed as such inorganic particles. Alternatively, secondary aggregated particles may be formed and employed. In order to obtain excellent glossiness, inorganic particles are preferably employed so as to form a particle size of 0.01 to 0.1 $\mu$m in the layer.

In the present invention, from the viewpoint of lower cost and possible realization of high reflection density, fine particles with low refractive index are preferred. More preferred as fine inorganic particles having an anionic surface are silicas synthesized by a gas phase method or colloidal silicas.

Further, employed as fine inorganic particles having the cationic surface may be surface-treated silica prepared by a gas phase method, cationic surface-treated colloidal silica and alumina, colloidal alumina, false boehmite, and the like.

Cited as examples of hydrophilic binders employed in the ink absorptive layer are polyvinyl alcohol, gelatin, polyethylene oxide, polyvinyl pyrrolidone, polyacrylic acid, polyacrylamide, polyurethane, dextran, dextrin, carrageenan ($\kappa$, $\iota$, $\lambda$, etc.), agar, Pullulan, water-soluble polyvinyl butyral, hydroxyethyl cellulose, carboxymethyl cellulose, and the like.

Two types or more of these binders may be used in combination.

The hydrophilic binder preferably employed in the present invention is polyvinyl alcohol.

In addition to the common polyvinyl alcohol obtained by hydrolyzing polyvinyl acetate, polyvinyl alcohols which are preferably employed in the present invention include modified polyvinyl alcohols such as polyvinyl alcohol in which the terminal is subjected to cation modification, anion modified polyvinyl alcohol having an anionic group, and the like.

Polyvinyl alcohols obtained by hydrolyzing polyvinyl acetate, which have a degree of polymerization of at least 1,000, are preferably employed and those having a degree of polymerization of 1,500 to 5,000 are more preferably employed.

Polyvinyl alcohols having a saponification degree of 70 to 100 percent are preferred, and those having a saponification degree of 80 to 99.5 percent are particularly preferred.

Cation modified polyvinyl alcohols include those described, for example, in Japanese Patent Publication Open to Public Inspection No. 61-10483, which comprise a primary, secondary, or tertiary amino group, or a quaternary ammonium group in the main or side chain of said polyvinyl alcohol, and are obtained by hydrolyzing a copolymer of an ethylenic unsaturated monomers having a cationic group with vinyl acetate.

Listed as ethylenic unsaturated monomers having a cationic group are, for example, trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxylethyltrimethylammonium chloride, trimethyl-(-methacrylamidopropyl)ammonium chloride, N-(1,1-dimethyl-3-dimethylaminopropyl)acrylamide, etc.

The ratio of monomers containing a cation-modified group of cation-modified polyvinyl alcohol is between 0.1 and 10 mole percent of vinyl acetate, and is preferably between 0.2 and 5 mole percent.

The anion-modified polyvinyl alcohol includes, for example, polyvinyl alcohol comprising an anionic group such as described in Japanese Patent Publication Open to Public Inspection No. 1-206088, copolymers of vinyl alcohol with a vinyl compound having a water-soluble group as described in Japanese Patent Publication Open to Public Inspection Nos. 61-237681 and 63-307979, and modified polyvinyl alcohol having a water-soluble group as described in Japanese Patent Publication Open to Public Inspection No. 7-285265.

The nonion-modified polyvinyl alcohol includes, for example, polyvinyl derivatives in which a polyalkylene oxide group is added to a part of the polyvinyl alcohol as described in Japanese Patent Publication Open to Public Inspection No. 7-9758 and block copolymers of a vinyl compound having a hydrophobic group with vinyl alcohol described in Japanese Patent Publication Open to Public Inspection No. 8-25795.

Two types or more of polyvinyl alcohols, which differ in the degree of polymerization and modification, may be employed in combination.

The added amount of fine inorganic particles, employed in the ink absorptive layer, largely depends on the desired ink absorbing capacity, the void ratio of the void layer, the types of inorganic fine particles, and the types of hydrophilic binders. However, said amount is commonly between 5 and 30 g per $m^2$ of the recording sheet, and is preferably between 10 and 25 g.

Further, the ratio of fine inorganic particles employed in the ink absorptive layer to the hydrophilic binder is commonly between 2:1 and 20:1, and is most preferably between 3:1 and 10:1.

The employed weight of water-soluble cationic polymers having quaternary ammonium bases in their molecules is commonly between 0.1 and 10 g per $m^2$ of the ink jet recording sheet and is preferably between 0.2 and 5 g.

On the other hand, the employed amount of polyalkylenepolyamine-dicyandiamide based polycondensation products and formalin-dicyandiamide based polycondensation products is commonly in the range of 0.05 to 5 g per $m^2$ of the recording sheet, and is preferably in the range of 0.1 to 2 g.

Further, the weight ratio of polyalkylenepolyamine-dicyandiamide based polycondensation products or formalin-dicyandiamide based polycondensation products to water-soluble polymers, having quaternary ammonium bases, is preferably between 0.05 and 1.0. When said ratio is at least 0.05, sufficient fading resistant effects are obtained. Further, when said ratio is no more than 1, the ink absorbing rate is acceptable. Due to the above points, said ratio is more preferably between 0.05 and 0.1.

In order to obtain excellent glossiness and to obtain the high void ratio without degrading layer brittleness, it is preferable that the aforementioned hydrophilic binders are hardened by hardeners.

Generally, hardeners are compounds which comprise a group capable of reacting with the aforementioned hydrophilic binders, or which promote reaction between different groups which said hydrophilic binders comprise, and are properly selected and employed in accordance with types of said hydrophilic binders.

Specific examples of hardeners include epoxy based hardeners (diglycidyl ethyl ether, ethylene glycol diglycidyl ether, 1,4-butanediol glycidyl ether, 1,6-diglycidylcyclohexane, N,N-diglycidyl-4-glycidyloxyaniline, sorbitol polyglycidyl ether, glycerol polyglycidyl ether, and the like), aldehyde based hardeners (formaldehyde, glyoxal, and the like), active halogen based hardeners (2,4-dichloro-4-hydroxy-1,2,5-s-triazine, and the like), active vinyl based compounds (1,3,5-trisacryloyl-hexahydro-s-triazine, bisvinylsulfonyl methyl ether, and the like), boric acids and salts thereof, borax, aluminum alum, and the like.

When polyvinyl alcohol and/or cation modified polyvinyl alcohol is employed as the particularly preferred hydrophilic binder, hardeners are preferably employed which are selected from boric acids and salts thereof, as well as epoxy based hardeners.

However, the most preferred hardeners are those selected from boric acids and salts thereof.

Boric acids or salts thereof, as described in the present invention, are oxygen acids having a boron atom as the central atom, and salts thereof, and specifically include orthoboric acid, diboric acid, metaboric acid, tetraboric acid, pentaboric acid, octaboric acid and salts thereof.

The employed amount of the aforementioned hardeners varies depending on types of hydrophilic binders, types of hardeners, types of fine inorganic particles, and the ratio to hydrophilic binders. However, said amount is commonly between 5 and 500 mg, and is preferably between 10 and 300 mg.

When coating a water-soluble coating composition for forming the water-based ink absorptive layer of the present invention, the aforementioned hardeners may be added to said coating composition. Alternatively, the water-based coating composition for forming the ink absorptive layer of the present invention may be applied onto a support onto which a coating composition comprising hardeners has been applied. Further, after coating the water-soluble coating composition (comprising hardeners) for forming the ink absorptive layer of the present invention, and subsequently drying, hardeners may be provided by coating thereon a hardener solution. However, of these, from the viewpoint of production efficiency, a method is preferred in which hardeners are incorporated into the water-soluble coating composition for forming the ink absorptive layer of the present invention and then coated.

A porous ink absorptive layer may be comprised of two layers or more. In such a case, the constitutions of these ink absorptive layers may be the same or different.

In the ink-receiving layer and an optional layer provided on demand of the ink-jet recording sheet, various additives can if desired be added.

For example, it is possible to add various additives, known in the art, such as UV absorbers described in Japanese Patent Publication Open to Public Inspection Nos. 57-74193, 57-87988 and 2-261476, antifading agents described in Japanese Patent Publication Open to Public Inspection Nos. 57-74192, 57-87989, 60-72785, 61-146591, 1-95091, 3-13376, etc., various anion, cation or nonion surface active agents, fluorescent whitening agents described in Japanese Patent Publication Open to Public Inspection Nos. 59-42993, 59-52689, 62-280069, 61-242871, 4-219266, etc., pH-adjusting agents such as sulfuric acid, phosphoric acid, acetic acid, citric acid, sodium hydroxide, potassium hydroxide, potassium carbonate, etc., antifoaming agents, lubricants such as diethylene glycol, etc., antiseptics, thickeners, antistatic agents, matting agents, etc.

Latex-based polymers are preferably incorporated specifically into the ink absorptive layer of the present invention, since fading resistant effects are further exhibited. Said latex-based polymers having a Tg (a glass transition point) of no more than 40° C. are preferably employed, since the desired effects of the present invention are further exhibited.

The latex-based polymers preferably employed in the present invention are preferably those prepared through polymerization employing an emulsion polymerization method, and preferably employed are, for example, polystyrene latex, styrene-butadiene copolymer latex, acrylonitrile-butadiene based latex, polyacrylic acid ester based latex, polymethacrylic acid based latex, vinyl chloride based latex, vinyl acetate based latex, ethylene-vinyl acetate based latex, and the like.

Listed as specific examples of the aforementioned latex based polymers may be styrene/butadiene latex (7/3), polyvinyl latex, vinyl acetate/ethylene latex (9/1), vinyl acetate/ethyl methacrylate latex (5/5), vinyl chloride/ethyl acrylate (3/2), ethyl acrylate/methyl acrylate/hydroxyethyl methacrylate (5/4/1), styrene/butyl acrylate/hydroxyethyl methacrylate (1/6/3), silicone latex, and the like. In the above description, the copolymerization ratio in parentheses represents a mole ratio.

The employed amount of the aforementioned polymer latex is preferably between 0.1 and 2 g per $m^2$ of the recording sheet. When the amount is at least 0.1 g, sufficient fading resistant effects are obtained. Further, when the amount is no more than 2 g, the void ratio in the ink absorptive layer does not decrease. As a result, the sufficient amount of an ink is absorbed without fail, to maintain the high ink absorption amount.

The ink absorptive layer may be comprised of two layers or more. In that case, constitutions of these ink absorptive layers may be the same or different.

In the recording sheet of the present invention, the light fastness of phthalocyanine based dyes are improved by adding polyalkylenepolyamine-dicyandiamide based polycondensation products to the ink absorptive layer on a water non-absorptive support. The resulting fading resistant effects may be maintained by further adding water-soluble reducing agents, sulfur-containing compounds, or hydrophobic antioxidant emulsified dispersions. When stored at high humidity, said fading resistant effects are prominently exhibited.

Water-soluble reducing agents are described in Japanese Patent Publication Open to Public Inspection Nos. 8-300807, 8-150773, 8-108617, 9-267544, and others. Cited as those are, for example, sulfites, nitrites, phosphites, thiosulfates, ascorbic acid or salts thereof, hydroxylamine derivatives (N,N-diethylhydroxylamine, N,N-disulfoethylhydroxylamine sodium salt, N-hydroxyphthalimide, N,N-dicarboxyethylhydroxylamine sodium salt, and the like), glucose, and the like.

Sulfur-containing compounds are described in Japanese Patent Publication Open to Public Inspection Nos. 61-177279, 61-163886, 64-36479, 7-314883, 7-314882, 1-115677, and others. Cited as those are, for example, thiocyanates, thiourea, 2-mercaptobenzimidazole, 2-mercaptobenzthiazole, 2-mercaptobenzoxazole, 5-mercapto-1-methyltetrazole, 2,5-dimercapto-1,3,4-triazole, 2,4,6-trimercaptocyanuric acid, thiosalicylic acid, thiouracil, 1,2-bis(2-hydroxyethylthio)ethane and the like.

Utilized as hydrophobic antioxidants may be antioxidants known in the art, such as described in, for example, Japanese Patent Publication Open to Public Inspection Nos. 57-74192, 57-87989, 1-115667, 3-13376, and others. Particularly preferred antioxidants are so-called hindered phenol based antioxidants, in which at least one of the hydroxyl groups in the ortho position is substituted with a tertiary alkyl group, piperidine based antioxidants (being so-called hindered amines) in which both of the two carbon atoms bonding to a nitrogen atom are substituted with alkyl groups, and antioxidants in which at least one hydroxyl group in the phenols or hydroxybenzenes is modified to ether by an alkyl group.

Aforementioned hydrophobic antioxidants are emulsifying-dispersed into a hydrophilic binder together with hydrophobic high boiling point organic solvents (such as di-2-ethylhexyl phthalate, di-i-decyl phthalate, tricresyl phosphate, tri-2-ethylhexyl phosphate, and the like), and the resulting dispersion is then added. When these hydrophobic antioxidants are dissolved in an organic solvent such as acetone, methanol, and the like, and added, or are added employing a wet shattering method, fading resistant retaining effects are degraded.

The ratio of the hydrophobic antioxidants to the high boiling point organic solvent is generally between 1:5 and 10:1, in terms of weight ratio.

The added amount of compounds, which maintain the fading resistant effects of the aforementioned polyalkylenepolyamine-dicyandiamide, is generally between 0.01 and 10 g per $m^2$ of the recording sheet.

Incidentally, in order to provide water resistance to a porous ink absorptive layer, generally, as inorganic pigments, fine alumina particles having a cationic surface are employed, or fine silica particles having a cationic surface are used together with a cationic polymer having quaternary ammonium bases. When the polyalkylenepolyamine-dicyandiamide based polycondensation product is incorporated into such an ink absorptive layer, bleeding tends to be enhanced after printing.

In order to minimize such degradation bleeding, when boric acid or salts thereof, or water-soluble polyvalent metal ions are incorporated into the ink absorptive layer, said bleeding is minimized.

Further, water soluble polyvalent metal ions include divalent to tetravalent metal ions, and specifically, listed are $Ca^{2+}$, $Mg^{2+}$, $Cu^{2+}$, $Fe^{3+}$, $Ni^{2+}$, $Co^{2+}$, $Al^{3+}$, and the like. Of these, $Ca^{2+}$, $Mg^{2+}$, $Zn^{2+}$, and $Al^{3+}$ are particularly preferred.

The added amount of such polyvalent metal ions is generally between 0.1 and 10 millimoles per $m^2$ of the recording sheet. When said amount is less than 0.1 millimole, no noticeable effects are obtained. On the other hand, when said amount exceeds 10 millimoles, dye aggregation is enhanced and a bronzing phenomenon tends to occur on the surface. The said amount is most preferably between 0.2 and 2 millimoles.

Further, it is necessary to pay attention on the content amount of univalent cations such as $K^+$, $Na^+$, $NH_4^+$, and the like in the ink absorptive layer comprising polyalkylenepolyamine-dicyandiamide polycondensation products.

The amount of said univalent cations exhibits relatively small effects on the ink absorbability, and bleeding and fading after printing. However, when added excessively, bleeding after printing tends to be enhanced. The added amount is preferably no more than 0.1 millimole per $m^2$ of the recording sheet, and is most preferably no more than 0.05 millimole. Further, the lower limit is not particularly specified.

Further, water-soluble polyvalent metal ions are preferably incorporated into the ink absorptive layer of the recording sheet of the present invention.

Employed as colorants may be pigments or dyes such as direct dyes, acid dyes, basic dyes, reactive dyes which are known in the ink jet art, or water-soluble dyes such as food dyes, and the like, or water-dispersible pigments. Of them, those, which are particularly effective, are dyes which comprise phthalocyanine based dyes as cyan dyes. The phthalocyanine dyes are particularly well known in the cyan based dyes and are employed.

Suitably employed as the supports of the ink jet recording sheets of the present invention can be conventional paper supports, plastic supports, composite supports, and the like known in the art. However, in order to obtain clear images with increased density, hydrophobic supports are preferred into which ink liquid does not penetrate.

In order to enhance the water resistance of a recording sheet as well as to minimize image bleeding, in addition to the aforementioned polyalkylenepolyamine-dicyandiamide based polycondensation products, further cationic fixing agents having quaternary ammonium bases are preferably employed in the ink absorptive layer. Listed as cationic fixing agents are water-soluble cationic polymers having quaternary ammonium bases in the molecule, silane coupling agents having quaternary ammonium bases, and the like.

Polyalkylenepolyamine-dicyandiamide polycondensation products themselves exhibit dye fixability. However, many such polycondensation products have relatively small molecular weight and thus occasionally do not exhibit sufficient fixability. On the other hand, when cationic fixing agents having quaternary ammonium bases are employed in the porous ink absorptive layer, light fastness, which is the problem to be solved in the present invention, tends to be degraded. However, when the polyalkylenepolyamine-dicyandiamide based polycondensation product according to the present invention is employed in combination, effects to improve dye fixability, that is water resistance as well as light fastness, are markedly exhibited.

Further, the silane coupling agent having quaternary ammonium bases reacts with the surface of fine inorganic particles such as silica and the like, and results in an increase in diffusion resistance. Thus it is capable of fixing dyes.

Listed as such coupling agents may be the following compounds which are described in, for example, Japanese Patent Publication Open to Public Inspection No. 8-34160.

(SC-1)

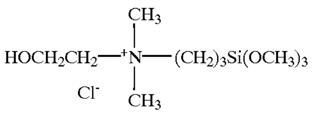

(SC-2)

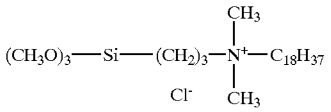

(SC-3)

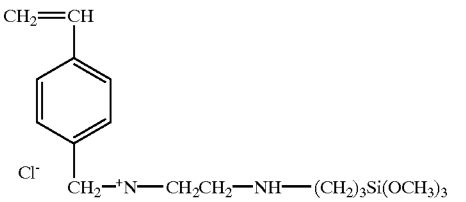

The employed amount of silane coupling agents illustrated above, having a quaternary ammonium base, is commonly in the range of 0.1 to 10 g per $m^2$ of the recording sheet, and is preferably in the range of 0.2 to 5 g. These silane coupling agents may be allowed to previously react with fine inorganic particles, may be added during an optional stage from coating of the ink absorptive layer to drying of the coating, or further may be provided in such a manner that, for example, its solution is prepared which is applied onto the previously formed ink absorptive layer.

Preferably employed as water non-absorptive supports are transparent or opaque plastic resin film supports, paper supports prepared by laminating the surfaces of paper with polyethylene, and the like.

The transparent supports include, films composed of materials such as, for example, polyester series resins, diacetate series resins, triacetate series resins, acrylic series resins, polycarbonate series resins, polyvinyl chloride series resins, polyimide series resins, cellophane, celluloid, and the like. Of them, those are preferred, which are durable for heat radiation when used for OHP, and polyethylene terephthalate is particularly preferred. The thickness of such transparent supports is preferably between about 10 and about 200 $\mu$m. It is preferred to provide sublayers on the ink receptive layer side and the backing layer side from the viewpoint of adhesion of the ink receptive layer and backing layer to the support.

Furthermore, preferably employed as supports which are used when transparency is not required are resin coated paper (so-called RC paper) having polyolefin resin coated layer comprising white pigments, etc. on at least one surface of a paper support, and so-called white PET prepared by adding white pigments to polyethylene terephthalate.

With the purpose of enhancing adhesion strength between the above-mentioned support and the ink receptive layer, the support is preferably subjected to corona discharge treatment and subbing treatment prior to coating the ink receptive layer. Further, the recording sheet of the present invention is not always required to be colorless and may be a colored recording sheet.

As the ink jet recording sheet of the present invention, a paper support which is laminated with polyethylene on both surfaces is particularly preferred because recorded images approach photographic qualities and are obtained at relatively low cost. Such a polyethylene laminated paper support is described below.

Paper employed for a paper support is produced employing wood pulp as a main raw material, and in addition, synthetic pulp such as polypropylene, etc. or synthetic fiber such as nylon, polyester, and the like, if required. As the wood pulp, any of LBKP, LBSP, NBKP, NBSP, LDP, NDP, LUKP, and NUKP can be employed. However, LBKP, NBSP, LBSP, NDP, and LDP having a shorter fiber portion are preferably employed in a larger ratio. However, a content ratio of LBSP and/or LDP is preferably between 10 and 70 weight percent.

As the above-mentioned pulp, chemical pulp (sulfate pulp or sulfite pulp) containing minimum impurities is preferably employed, and pulp which is subjected to bleaching treatment to increase whiteness is also beneficial.

Into the paper, can appropriately be added higher fatty acids, sizing agents such as alkylketene dimer, etc., white pigments such as calcium carbonate, talc, titanium oxide, etc., paper strengthening agents such as starch, polyacrylamide, polyvinyl alcohol, etc., fluorescent whitening agents, moisture maintaining agents such as polyethylene glycol, etc., dispersing agents, softening agents such as quaternary ammonium, etc.

The degree of water freeness of pulp employed for paper-making is preferably between 200 and 500 ml according to CSF specification. Furthermore, the sum of weight percent of 24-mesh residue and weight percent of 42-mesh calculated portion regarding the fiber length after beating, specified in JIS-P-8207 is preferably between 30 and 70 percent. Further, the weight percent of 4-mesh residue is preferably no more than 20 weight percent.

The weight of the paper is preferably between 30 and 250 g/$m^2$, and is most preferably between 50 and 200 g/$m^2$. The thickness of the paper is preferably between 40 and 250 $\mu$m.

The paper may be calendered, during or after paper-making process, to result in enhanced smoothness. The density of the paper is generally between 0.7 and 1.2 g/$m^2$ (JIS-P-8118). Furthermore, the rigidity of the base paper is preferably between 20 and 200 g under conditions specified in JIS-P-8143.

A surface sizing agent may be coated onto the surface of the paper. As surface sizing agents, the same as those described above which can be incorporated into the paper can be employed.

The pH of the paper, when measured employing a hot water extraction method specified in JIS-P-8113, is preferably between 5 and 9.

As polyethylene which covers both surfaces of the paper, low density polyethylene (LDPE) and/or high density polyethylene (HDPE) is mainly employed. However, other than these, LLDPE, polypropylene, and the like can be partially employed.

Specifically, a polyethylene layer on the surface of an ink receptive layer is preferably one in which, as carried out in photographic paper, rutile- or anatase-type titanium oxide is incorporated into polyethylene, and opacity as well as whiteness are improved. The content of titanium oxide is generally between 3 and 20 percent by weight of polyethylene, and is preferably between 4 and 13 percent by weight.

Polyethylene coated paper can be employed as glossy paper. Furthermore, in the present invention, polyethylene coated paper having a matte or silk surface can also be employed, which is prepared by embossing when polyethylene is melt-extrude-coated onto the surface of the paper.

The employed amount of polyethylene on both surfaces of the paper is determined so that after providing an ink receptive layer and a backing layer, tendency to curl is minimized under low and high humidity. Generally, the thickness of the polyethylene layer on the ink receptive layer side is in the range of 20 to 40 $\mu$m and that of the backing layer side is in the range of 10 to 30 $\mu$m.

Further, the above-mentioned polyethylene coated paper support having the following characteristics is preferably employed:

1. Tensile strength: being strength specified in JIS-P-8113, 2 to 30 kg in the longitudinal direction, and 1 to 20 kg in the lateral direction
2. Tear strength: to be 10 to 200 g in the longitudinal direction and 20 to 200 g in the lateral direction in accordance with the method specified in JIS-P-8116
3. Compression elastic modulus: 103 kgf/cm$^2$ or more
4. Beck surface smoothness: preferably no less than 20-second light for a gloss surface under conditions specified in JIS-P-8119, and for embossed paper support, acceptable for less than this value
5. Opacity: transmittance of visible light is preferably no more than 20% and most preferably no more than 15% under measurement conditions of parallel light incidence/diffused light transmission.

With the recording sheet of the present invention, various types of hydrophilic layers such as a void layer, a sublayer, etc., which are optionally employed, if required, are coated onto a support employing a method suitably selected from those known in the art. A preferred method is such that a coating composition composing each layer is coated and dried. In this case, at least two layers can be simultaneously coated. Specifically, simultaneous coating is preferred, which coats all hydrophilic binder layers simultaneously.

Employed as the coating methods are preferably a roll coating method, a rod bar coating method, an air knife coating method, a spray coating method, a curtain coating method, or an extrusion coating method employing a hopper, as described in U.S. Pat. No. 2,681,294.

When images are recorded employing the ink jet recording sheet of the present invention, a recording method using water-based ink is preferably employed.

The water-based ink comprises liquid media composed of primarily colorant and water, and other additives. Employed as colorants can be water-soluble dyes and water-dispersed pigments, known in the art regarding ink jet printing such as direct dyes, acid dyes, basic dyes, reactive dyes, or food dyes, etc.

Listed as solvents of water-based inks are water and various water-soluble organic solvents, for example, alcohols such as methyl alcohol, isopropyl alcohol, n-butyl alcohol, tert-butyl alcohol, isobutyl alcohol, etc.; amides such as dimethylformamide, dimethylacetamide, etc.; ketones or ketone alcohols such as acetone, diacetone alcohol, etc.; ethers such as tetrahydrofran, dioxane, etc.; polyalkylene glycols such as polyethylene glycol, polypropylene glycol, etc.; polyhydric alcohols such as ethylene glycol, propylene glycol, butylene glycol, triethylene glycol, 1,2,6-hexanetriol, thioglycol, hexylene glycol, diethylene glycol, glycerin, triethanolamine, etc.; lower alkyl ethers of polyhydric alcohols such as ethylene glycol methyl ether, diethylene glycol methyl (or ethyl) ether, triethylene glycol monobutyl ether, etc.; and the like.

Of a number of these water-soluble organic solvents, polyhydric alcohols such as diethylene glycol, triethanolamine, glycerin, etc., and lower alkyl ethers of polyhydric alcohols such as triethylene glycol monobutyl ether, etc., are preferred.

Other additives for the water-based inks include, for example, pH regulators, sequestering agents, mildewcides, viscosity modifiers, surface tension adjusting agents, wetting agents, surface active agents, rust preventives, etc.

In order to improve wettability onto a recording sheet, the water-based ink solution generally has, at 20° C., a surface tension in the range of 25 to 60 dyn/cm, and preferably in the range of 30 to 50 dyn/cm.

EXAMPLES

The present invention is explained with reference to examples below, however, the present invention is not limited to these examples.

In examples "%" represents the absolute dry weight percent, unless otherwise specified.

Example 1

(Preparation of Silica Dispersion-1)

Employing a jet stream-inductor mixer, TDS, manufactured by Mitamura Riken Kogyo Co., 125 kg of gas phase method silica (Aerosil 300, prepared by Nihon Aerosil Kogyo Co.), having an average primary particle diameter of 0.007 $\mu$m, were suction-dispersed at room temperature into 620 liters of pure water having a pH of 3.0 adjusted with nitric acid. The total volume was then adjusted to 694 liters employing pure water.

(Preparation of Silica Dispersion-2)

Added while stirring to 18 liters of an aqueous solution (at a pH of 3.0) comprising 1.63 kg of the cationic polymer (P-1) described below, 2.2 liters of ethanol, and 1.5 liters of propanol, were 69.4 liters of Silica Dispersion-1, and subsequently, 1 g of an antifoaming agent (SN381, manufactured by San Nobuko Co.).

The resulting mixture was dispersed employing a high pressure homogenizer manufactured by Sanwa Kogyo Co., and the total volume was adjusted to 97 liters, employing pure water.

P-1

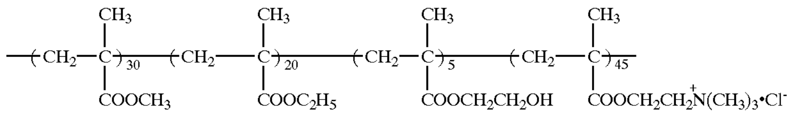

(Preparation of a Coating Composition)

The coating composition described below was prepared employing the aforementioned Dispersion-2.

Successively blended while stirring at 40° C. with 650 ml of silica Dispersion-2 were the additives described below:

| | | |
|---|---|---|
| 1. | 10% aqueous polyvinyl alcohol (PVA203, manufactured by Kuraray Kogyo Co.) solution | 6 ml |
| 2. | 5% aqueous polyvinyl alcohol (PVA235, manufactured by Kuraray Kogyo Co.) solution | 240 ml |
| 3. | Polyalkylenepolyamine-dicyandiamide based polycondensation product shown in Table 1 (the figure is the added amount per $m^2$ of the recording sheet) | |
| 4. | 10% aqueous acid processed gelatin solution | 24 ml |
| 5. | The total volume is adjusted to 1,000 ml employing pure water. | |

<Preparation of the Ink Jet Recording Sheet>

Applied onto a polyethylene coated paper (comprising on the ink receptive layer side, anatase type titanium oxide, in an amount of 8 percent by weight of said polyethylene, also, on the ink receptive layer a gelatin sublayer having a weight of 0.05 $g/m^2$, and on the opposite side, the backing layer comprised of 0.2 $g/m^2$ of latex having a Tg of about 80° C.) prepared by laminating both surfaces of a 170 $g/m^2$ base paper with polyethylene, was the aforementioned coating composition so as to obtain a wet layer thickness of 170 $\mu$m. The coating was temporarily cooled to about 7° C. and then dried with airflow at 20 to 65° C. Thus Recording Sheets-1 through -5 were prepared.

Comparative Example 1

Recording Sheets-1A through -5A were prepared in the same manner as Example 1, except that the support employed in Example 1 was replaced with a 170 $\mu$m thick hydrophilic cast coated paper.

The light fastness of each of the obtained recording sheets was evaluated.

<Light Fastness>

Each recording sheet was printed in an ink jet printer, employing a water based ink comprising 2 percent by weight of phthalocyanine based cyanine dye, 6 percent by weight of glycerin, and 20 percent by weight of ethylene glycol, while varying stepwise the ejected ink amount.

The resultant image was irradiated for 20 and 80 days with the printed surface being under about 2,000 Lux, employing a fluorescent lamp fading test apparatus under two ambient conditions; 30° C. and 50% RH, and 30° C. and 75% RH.

The reflection density after light irradiation by the fluorescent lamp, which had a reflection density of 1.0, was denoted as the residual dye ratio and it was employed as the standard of light fastness.

Table 1 shows the obtained results.

TABLE 1

| Recording Sheet | Support | Dicyandiamide Based Polycondensation Product* | Light Fastness 30° C. and 50% RH 20 Days | Light Fastness 30° C. and 50% RH 80 Days | Light Fastness 30° C. and 75% RH 20 Days | Light Fastness 30° C. and 75% RH 80 Days |
|---|---|---|---|---|---|---|
| 1 (Comparative Example) | RC Paper | not added | 0.92 | 0.43 | 0.85 | 0.20 |
| 2 (Present Invention) | RC Paper | A1 (0.6) | 0.95 | 0.82 | 0.92 | 0.57 |
| 3 (Present Invention) | RC Paper | A2 (0.6) | 0.94 | 0.83 | 0.90 | 0.61 |
| 4 (Present Invention) | RC Paper | A3 (0.6) | 0.96 | 0.81 | 0.89 | 0.65 |
| 5 (Present Invention) | RC Paper | A4 (0.6) | 0.94 | 0.79 | 0.92 | 0.63 |
| 1A (Comparative Example) | Cast Coated Paper | not added | 0.85 | 0.21 | 0.71 | 0.12 |
| 2A (Comparative Example) | Cast Coated Paper | A1 (0.6) | 0.86 | 0.24 | 0.74 | 0.13 |
| 3A (Comparative Example) | Cast Coated Paper | A2 (0.6) | 0.87 | 0.21 | 0.73 | 0.17 |
| 4A (Comparative Example) | Cast Coated Paper | A3 (0.6) | 0.84 | 0.23 | 0.69 | 0.14 |
| 5A (Comparative Example) | Cast Coated Paper | A4 (0.6) | 0.85 | 0.22 | 0.67 | 0.16 |

RC Paper: Support laminated with polyethylene on both surfaces
A1: Kayafix M (manufactured by Nihon Kayaku Co.)
A2: Nefix RP-70 (manufactured by Nikka Kagaku Co.)
A3: Taijinfix 400 (manufactured by Nissei Kasei Co.)
A4: Parafix EP (manufactured by Ohra Palladium Kagaku Co.)
* Figure in parenthesis shows the added amount in g.

From the results in Table 1, it is revealed that the light fastness of Recording Sheets-1 through -5 of the present invention, employing a water non-absorptive support are highly superior to comparative Recording Sheets-1A through 5A employing a water absorbable support, and the addition of the polyalkylenepolyamine-dicyandiamide based polycondensation products of the present invention further enhances light fastness.

On the other hand, when the hydrophilic support is employed, the addition of the polyalkylenepolyamine-dicyandiamide based polycondensation products minimally enhances light fastness.

Example 2

Recording Sheets-21 trough 29 were prepared in the same manner, by adding water-soluble polyvalent metal compounds to Recording Sheet-2 prepared in Example 1. Further, Recording Sheets-11 and -12 were also prepared in the same way as Recording Sheet-1 except that water soluble polyvalent metal compounds was added to Recording Sheet-1.

The light fastness of each of obtained Recording sheets was evaluated in the same manner as Example 1, and bleeding after printing was evaluated as described below. Table 2 shows the obtained results.

<Bleeding>

Cyan lines were printed employing the ink jet printer as well as the ink employed in the light fastness test, and were stored at 40° C. and 80% RH for 5 days.

Line width (width between parts having one half of the maximum density was denoted as line width) was measured before and after storage, employing a microdensitometer. Values obtained by the formula described below were denoted as bleeding. The lower the value, the more reduced bleeding.

(Line width after storage (in μm)−line width before storage (in μm)/line width before storage (in μm)

TABLE 2

| Recording Sheet | Water soluble Polyvalent Metal Salt* | Light Fastness 30° C. and 50% RH 20 Days | 80 Days | 30° C. and 75% RH 20 Days | 80 Days | Bleeding |
|---|---|---|---|---|---|---|
| 1 (Comparative Example) | not added | 0.92 | 0.43 | 0.85 | 0.20 | 0.29 |
| 11 (Comparative Example) | $CaCl_2$(0.08) | 0.92 | 0.45 | 0.86 | 0.23 | 0.61 |
| 12 (Comparative Example) | $MgCl_2$(0.08) | 0.92 | 0.47 | 0.85 | 0.21 | 0.38 |
| 2 (Present Invention) | not added | 0.95 | 0.82 | 0.92 | 0.57 | 0.92 |
| 21 (Present Invention) | $CaCl_2$(0.05) | 0.94 | 0.80 | 0.91 | 0.61 | 0.65 |
| 22 (Present Invention) | $CaCl_2$(0.20) | 0.91 | 0.83 | 0.91 | 0.65 | 0.48 |
| 23 (Present Invention) | $CaCl_2$(0.80) | 0.92 | 0.84 | 0.92 | 0.67 | 0.32 |
| 24 (Present Invention) | $CaCl_2$(2.00) | 0.92 | 0.86 | 0.93 | 0.70 | 0.27 |
| 25 (Present Invention) | $CaCl_2$(10.0) | 0.92 | 0.83 | 0.93 | 0.74 | 0.25 |
| 26 (Present Invention) | $MgSO_4$(0.08) | 0.95 | 0.84 | 0.88 | 0.68 | 0.35 |
| 27 (Present Invention) | $ZnSO_4$(0.08) | 0.94 | 0.81 | 0.91 | 0.65 | 0.37 |
| 28 (Present Invention) | $Al_2Cl_3$(0.08) | 0.93 | 0.83 | 0.90 | 0.66 | 0.31 |
| 29 (Present Invention) | $K_2SO_4$(0.08) | 0.94 | 0.82 | 0.89 | 0.64 | 0.88 |

All supports are RC paper.
* Figure in parenthesis shows the added amount in g.

From the results in Table 2, it is found that the addition of the polyalkylenepolyamine-dicyandiamide based polycondensation products somewhat increases bleeding (when comparing Recording Sheet-2 with respect to Recording Sheet-1). Further, it is found that the light fastness of Recording Sheets-11 and 12 degrades, when stored over an extended period of time.

As this cause, it is considered that dyeability to cationic polymers, having higher dye fixability, is degraded by the polyalkylenepolyamine-dicyandiamide based polycondensation product. However, it is found that the bleeding of Recording Sheets-21 trough -28 comprising the water-soluble polyvalent metal salt is reduced without adversely affecting the light fastness.

It is found that in Recording Sheet-29, comprising a salt, which does not belong to the polyvalent metal salts, no improved effects are obtained for bleeding. Further, it was observed that Recording Sheet-25 tended to exhibit surface bronzing.

Example 3

The Silica Dispersion-3 comprising a boric salt was prepared in the same manner as Silica Dispersion 2 prepared in Example 1.

(Preparation of Silica Dispersion-3)

Added while stirring to 18 liters of an aqueous solution (having a pH of 3.0) containing 1.63 kg of the cationic polymer (P-1 described above), 2.2 liters of ethanol, and 1.5 liters of propanol were 69.4 liters of Silica Dispersion-1. Then, added to the resulting mixture were 7.0 liters of an aqueous solution containing 260 g of boric acid and 230 g of borax, and subsequently, 1 g of an antifoaming agent (SN381, described above).

The resulting mixture was subjected to dispersion, employing a high-pressure homogenizer manufactured by Sanwa Kogyo Co., and the total volume was adjusted to 97 liters with pure water.

(Preparation of a Coating Composition)

The coating composition described below was prepared, employing the aforementioned Silica Dispersion-3, so that the polyalkylenepolyamine-dicyandiamide based polycondensation product was added in the amounts shown in Table 3.

While stirring added to 650 ml of Silica Dispersion-3 were successively added the additives described below:

| | | |
|---|---|---|
| 1. | 10% Aqueous polyvinyl alcohol (PVA203, described above) solution | 6 ml |
| 2. | 5% Aqueous polyvinyl alcohol (PVA235, described above) solution | 260 ml |
| 3. | Polyalkylenepolyamine-dicyandiamide based polycondensation product shown in Table 3 (the figure is the amount added per $m^2$ of the recording sheet) | |
| 4. | 10% Aqueous acid process gelatin solution | 24 ml |
| 5. | The total volume was adjusted to 1,000 ml employing pure water. | |

<Preparation of Recording Sheets>

Recording Sheets-31 through -35, comprising boric acid corresponding to Recording Sheets-1 through -5 prepared in Example 1, were prepared in the same manner as Example 1. However, as the support, RC paper was used.

The obtained Recording Sheets were subjected to evaluation for light fastness, as well as bleeding in the same manner as Examples 1 and 2. The results, shown in Table 3, were obtained.

TABLE 3

| Recording Sheet | Dicyandiamide Based Polycondensation Product* | Light Fastness 30° C. and 50% RH 20 Days | 80 Days | 30° C. and 75% RH 20 Days | 80 Days | Bleeding |
|---|---|---|---|---|---|---|
| 1 (Comparative Example) | not added | 0.92 | 0.43 | 0.85 | 0.20 | 0.29 |
| 2 (Present Invention) | A1(0.6) | 0.95 | 0.82 | 0.92 | 0.57 | 0.92 |
| 3 (Present Invention) | A2(0.6) | 0.94 | 0.83 | 0.90 | 0.61 | 1.01 |
| 4 (Present Invention) | A3(0.6) | 0.96 | 0.81 | 0.89 | 0.65 | 0.898 |
| 5 (Present Invention) | A4(0.6) | 0.94 | 0.79 | 0.92 | 0.63 | 0.72 |
| 31 (Comparative Example) | not added | 0.91 | 0.40 | 0.82 | 0.16 | 0.28 |
| 32 (Present Invention) | A1(0.6) | 0.93 | 0.79 | 0.90 | 0.55 | 0.41 |
| 33 (Present Invention) | A2(0.6) | 0.91 | 0.81 | 0.87 | 0.57 | 0.36 |
| 34 (Present Invention) | A3(0.6) | 0.93 | 0.80 | 0.85 | 0.58 | 0.37 |

TABLE 3-continued

| Recording Sheet | Dicyandiamide Based Polycondensation Product* | Light Fastness 30° C. and 50% RH 20 Days | 80 Days | 30° C. and 75% RH 20 Days | 80 Days | Bleeding |
|---|---|---|---|---|---|---|
| 35 (Present Invention) | A4(0.6) | 0.92 | 0.82 | 0.90 | 0.60 | 0.36 |

All supports are RC paper.
* Figure in parenthesis shows the added amount in g.

From the results of Table 3, it is found that bleeding of Recording Sheets comprising boric salts is reduced due to the addition of the polyalkylenepolyamine-dicyandiamide based polycondensation product, without adversely affecting the light fastness.

Example 4

(Preparation of Silica Dispersion-4)

Silica Dispersion-4 was prepared in the same manner as Silica Dispersion-2, except that in Silica Dispersion-3, cationic polymer P-1 was replaced with P-2, and the weight of boric acid and borax was varied to 200 g and 210 g, respectively.

P-2

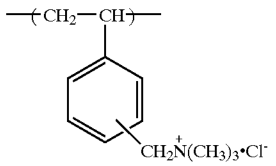

(Preparation of Titanium Oxide Dispersion)

Added to 75 liters of an aqueous solution containing one liter of 5% aqueous sodium tripolyphosphate solution, 10 liters of polyvinyl alcohol (PVA235), 3 ml of an antifoaming agent (SN381), and 1.5 kg of cationic polymer (P-1), were 25 kg of titanium oxide W-10 (manufactured by Ishihara Sangyo Co.), and the resulting mixture was dispersed employing a high pressure homogenizer. The total volume was then adjusted to 100 liters by adding pure water. Thus a titanium oxide dispersion was obtained.

(Preparation of Oil Dispersion-1)

Added at 50° C. to 270 liters of an aqueous solution containing 11 kg of acid process gelatin, 10 kg of cationic polymer (P-1), and 270 liters of an aqueous solution comprising 11 kg of saponin were 34 kg of di-i-decyl phthalate and 45 liters of ethyl acetate, and the resulting mixture was subjected to emulsified dispersion, employing a high pressure homogenizer. Thereafter the total volume was adjusted to 380 liters by adding pure water. Thus Oil Dispersion-1 was prepared.

(Preparation of Coating Compositions)

The four types of coating compositions described below were prepared.

| Coating Composition for First Layer (lowest layer) | |
|---|---|
| Silica Dispersion-3 | 600 ml |
| 10% Aqueous polyvinyl alcohol (PVA203) solution | 6.1 ml |
| 5% Aqueous polyvinyl alcohol (PVA235) solution | 260 ml |

-continued

| | |
|---|---|
| Oil Disperion-1 | 29 ml |
| Titanium oxide dispersion | 33 ml |
| Cationic latex (AE-803, manufactured by Showa Kobunshi Kogyo Co.) | 36 ml |
| Polyalkylenepolyamine-dicyandiamide based polycondensation product (figures show the added amount per m$^2$ of the recording sheet) | |
| Pure water to make | 1000 ml |
| (pH of the coating solution is 4.5) | |
| **Coating Composition for Second Layer** | |
| Silica Dispersion-3 | 670 ml |
| 10% Aqueous polyvinyl alcohol (PVA203) solution | 6.1 ml |
| 5% Aqueous polyvinyl alcohol (PVA235) solution | 240 ml |
| Oil Dispersion-i | 41 ml |
| Cationic latex (AE-803, described above) | 11 ml |
| Polyalkylenepolyamine-dicyandiamide based polycondensation product shown in Table 4 (figures show the added amount per m$^2$ of the recording sheet) | |
| Pure water to make | 1000 ml |
| (pH of the coating solution is 4.5) | |
| **Coating Composition for Third Layer** | |
| Silica Dispersion-4 | 630 ml |
| 10% Aqueous polyvinyl alcohol (PVA203) solution | 6.1 ml |
| 5% Aqueous polyvinyl alcohol (PVA235) solution | 260 ml |
| Oil Dispersion-1 | 41 ml |
| Cationic latex (AE-803, described above) | 11 ml |
| Pure water to make | 1000 ml |
| (pH of the coating solution is 4.5) | |
| **Coating Composition for Fourth Layer (being upper most layer)** | |
| Silica Dispersion-4 | 610 ml |
| 10% Aqueous polyvinyl alcohol (PVA203) solution | 6.1 ml |
| 5% Aqueous polyvinyl alcohol (PVA235) solution | 270 ml |
| Silicone oil dispersion (By-22-839, manufactured by Toray-Dow Coming-Silicone Co.) | 16 ml |
| 50% aqueous saponin solution | 2 ml |
| Pure water to make | 1000 ml |
| (pH of the coating solution is 4.5) | |

<Preparation of Recording Sheet>

Recording Sheets-41 through -45 and Recording Sheets-41A through -45A were prepared by simultaneously applying the above-mentioned first through fourth layer coating compositions onto a support employed in Example 1 so as to obtain a wet layer thickness of 45 μm for each.

Employing these Recording Sheets, light fastness was evaluated in the same manner as for Example 1, and the results shown in Table 4 were obtained.

TABLE 4

| Recording Sheet | Support | Dicyandiamide Based Polycondensation Product* | Light Fastness 30° C. and 50% RH 20 Days | 80 Days | 30° C. and 75% RH 20 Days | 80 Days |
|---|---|---|---|---|---|---|
| 41 (Comparative Example) | RC paper | not added | 0.91 | 0.57 | 0.87 | 0.24 |
| 42 (Present Invention) | RC paper | A1(0.4) | 0.95 | 0.84 | 0.94 | 0.63 |

TABLE 4-continued

| Recording Sheet | Support | Dicyandiamide Based Polycondensation Product* | Light Fastness 30° C. and 50% RH 20 Days | Light Fastness 30° C. and 50% RH 80 Days | Light Fastness 30° C. and 75% RH 20 Days | Light Fastness 30° C. and 75% RH 80 Days |
|---|---|---|---|---|---|---|
| 43 (Present Invention) | RC paper | A2(0.4) | 0.96 | 0.85 | 0.94 | 0.66 |
| 44 (Present Invention) | RC paper | A3(0.4) | 0.97 | 0.85 | 0.92 | 0.69 |
| 45 (Present Invention) | RC paper | A4(0.4) | 0.95 | 0.83 | 0.93 | 0.61 |
| 41A (Comparative Example) | cast coated paper | not added | 0.81 | 0.18 | 0.65 | 0.10 |
| 42A (Comparative Example) | cast coated paper | A1(0.4) | 0.84 | 0.22 | 0.69 | 0.12 |
| 43A (Comparative Example) | cast coated paper | A2(0.4) | 0.86 | 0.24 | 0.65 | 0.11 |
| 44A (Comparative Example) | cast coated paper | A3(0.4) | 0.84 | 0.20 | 0.61 | 0.12 |
| 45A (Comparative Example) | cast coated paper | A4(0.4) | 0.81 | 0.20 | 0.62 | 0.15 |

* Figure in parenthesis shows the added amount in g.

From the results of Table 4, it is found that when the ink absorptive layer is composed of a multilayer; polyalkylenepolyamine-dicyandiamide based polycondensation products are incorporated into two layers adjacent to the support; and the support is hydrophobic, fading resistant effects are obtained.

Example 5

An oil dispersion was prepared in the same manner as Oil Dispersion 1, except that during the preparation of Oil Dispersion-1 of Example 4, each of the hydrophobic antioxidants shown in Table 5 was added together with di-i-decyl phthalate and ethyl acetate. In Table 5, the numerical value is the total added amount per m$^2$ of the recording sheet.

Recording Sheet-51 through -55 (comprising polyalkylenepolyamine-dicyandiamide based polycondensation products corresponding to Recording Sheet-42) were prepared in the same manner as Recording Sheet-41 and -42, except that Oil Dispersions for the first layer to the third layer of Recording Sheet-41 and -42 were replaced with Oil Dispersions prepared as described above.

The light fastness of these Recording Sheets was evaluated in the same manner as Example 1 and the results shown in Table 5 were obtained.

TABLE 5

| Recording Sheet | Hydrophobic Antioxidant* | Light Fastness 30° C. and 50% RH 20 Days | Light Fastness 30° C. and 50% RH 80 Days | Light Fastness 30° C. and 75% RH 20 Days | Light Fastness 30° C. and 75% RH 80 Days |
|---|---|---|---|---|---|
| 42 (Present Invention) | not added | 0.95 | 0.84 | 0.94 | 0.63 |
| 51 (Present Invention) | S1(0.4) | 0.95 | 0.88 | 0.96 | 0.82 |
| 52 (Present invention) | S2(0.4) | 0.96 | 0.87 | 0.95 | 0.81 |
| 53 (Present Invention) | S3(0.4) | 0.95 | 0.88 | 0.94 | 0.79 |
| 54 (Present Invention) | S4(0.4) | 0.96 | 0.89 | 0.94 | 0.82 |
| 55 (Present Invention) | S5(0.4) | 0.96 | 0.88 | 0.95 | 0.83 |
| 41 (Comparative Example) | not added | 0.91 | 0.57 | 0.87 | 0.24 |
| 51B (Comparative Example) | S1(0.4) | 0.92 | 0.62 | 0.88 | 0.32 |
| 52B (Comparative Example) | S2(0.4) | 0.92 | 0.59 | 0.88 | 0.27 |
| 53B (Comparative Example) | S3(0.4) | 0.91 | 0.60 | 0.89 | 0.31 |
| 54B (Comparative Example) | S4(0.4) | 0.92 | 0.61 | 0.88 | 0.33 |
| 55B (Comparative Example) | S5(0.4) | 0.91 | 0.63 | 0.89 | 0.29 |

* Figure in parenthesis shows the added amount in g.

S1

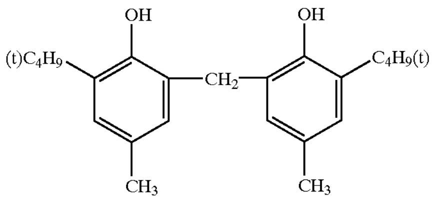

S2

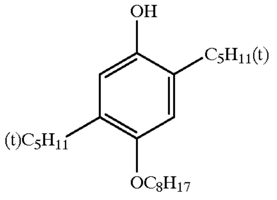

S3

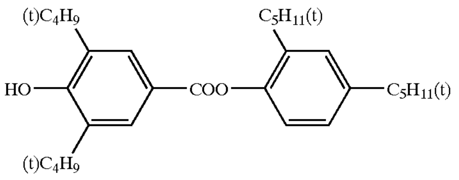

S4

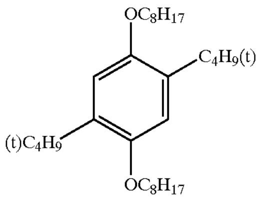

-continued

S5

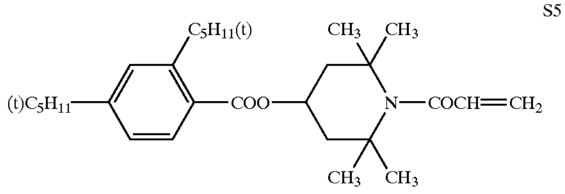

From the results shown in Table 5, it is found that the fading resistant effects of the polyalkylenepolyamine-dicyandiamide based polycondensation products are maintained for a longer period of time. Particularly, it is found that said effects are markedly exhibited when stored at higher humidity.

On the other hand, when the polyalkylenepolyamine-dicyandiamide based polycondensation products are not incorporated, high fading resistant effects are not obtained by the addition of the aforementioned antioxidants.

Example 6

Recording Sheets-61 through -66 and Recording Sheets-61B through -66B were prepared in the same manner as Example 4, in which to Recording Sheets-41 and -42 of Example 4, the various additives shown in Table 6 were added.

Each of the aforementioned additives was dissolved in either water or methanol. The resulting solution was added to the first layer coating composition. The added amount shown in Table 6 is the amount per $m^2$ of the recording sheet.

Corresponding to Recording Sheet-42, Recording Sheets-61 through -66 comprise polyalkylenepolyamine-dicyandiamide based polycondensation products, while corresponding to Recording Sheet-41, Recording Sheets-61B through -66B do not comprise polyalkylenepolyamine-dicyandiamide based polycondensation products.

The obtained recording sheets were evaluated in the same manner as Example 4. Table 6 shows the obtained results.

TABLE 6

| Recording | | Light Fastness | | | |
|---|---|---|---|---|---|
| | | 30° C. and 50% RH | | 30° C. and 75% RH | |
| Sheet | Additive* | 20 Days | 80 Days | 20 Days | 80 Days |
| 42 (Inv.) | not added | 0.95 | 0.84 | 0.94 | 0.63 |
| 61 (Inv.) | AA (0.4) | 0.97 | 0.87 | 0.96 | 0.80 |
| 62 (Inv.) | GLU (0.8) | 0.96 | 0.88 | 0.95 | 0.81 |
| 63 (Inv.) | HAS (0.4) | 0.96 | 0.89 | 0.96 | 0.83 |
| 64 (Inv.) | DTE (0.4) | 0.96 | 0.90 | 0.95 | 0.84 |
| 65 (Inv.) | MBI (0.4) | 0.96 | 0.90 | 0.95 | 0.85 |
| 66 (Inv.) | TS (0.2) | 0.95 | 0.91 | 0.96 | 0.86 |
| 41 (Inv.) | not added | 0.91 | 0.57 | 0.87 | 0.24 |
| 61B (Comp.) | AA (0.4) | 0.94 | 0.63 | 0.89 | 0.27 |
| 62B (Comp.) | GLU (0.8) | 0.95 | 0.60 | 0.88 | 0.22 |
| 63B (Comp.) | HAS (0.4) | 0.94 | 0.61 | 0.87 | 0.26 |
| 64B (Comp.) | DTE (0.4) | 0.96 | 0.62 | 0.88 | 0.26 |
| 65B (Comp.) | MBI (0.4) | 0.96 | 0.61 | 0.89 | 0.24 |
| 66B (Comp.) | TS (0.2) | 0.96 | 0.62 | 0.90 | 0.28 |

* Figure in parenthesis shows the added amount in g.
AA: ascorbic acid
GLU: glucose
HAS: HON $(CH_2CH_2SO_3Na)_2$
DTE: $HOCH_2CH_2SCH_2CH_2SCH_2CH_2OH$
MBI: 2-mercaptobenzimidazole
TS: thiocyanuric acid From the results shown in Table 6, it is found that when the water-soluble reducing agent is employed together with the polyalkylenepolyamine-dicyandiamide based polycondensation product (Recording Sheets-61 through -63), or is employed together with the sulfur containing compound (Recording Sheets-64 through -66), light fastness is improved over an extended period of time.

On the other hand, when the polyalkylenepolyamine-dicyandiamide based polycondensation products are not incorporated, the addition of only the aforementioned additives exhibits insufficient fading resistant effects for phthalocyanine based dyes.

Recording Sheets-1X through -5X and Recording Sheets-1AX through -5AX were prepared in the same manner as Example 1, except that during the preparation of Silica Dispersion-2 in Example 1, cationic polymers were not used. Evaluation was carried out in the same manner as Example 1. Table 7 shows the obtained results.

TABLE 7

| | 30° C. and 50% RH | | 30° C. and 75% RH | |
|---|---|---|---|---|
| | 20 Days | 80 Days | 20 Days | 80 Days |
| 1X | 0.98 | 0.82 | 0.90 | 0.46 |
| 2X | 0.99 | 0.89 | 0.94 | 0.80 |
| 3X | 0.99 | 0.91 | 0.96 | 0.79 |
| 4X | 0.98 | 0.90 | 0.95 | 0.76 |
| 5X | 0.98 | 0.88 | 0.93 | 0.78 |
| 1AX | 0.87 | 0.24 | 0.80 | 0.20 |
| 2AX | 0.86 | 0.27 | 0.79 | 0.21 |
| 3AX | 0.89 | 0.30 | 0.83 | 0.34 |
| 4AX | 0.90 | 0.29 | 0.84 | 0.33 |
| 5AX | 0.90 | 0.31 | 0.83 | 0.35 |

From the results shown in Table 7, it is found that even though the cationic polymers are not incorporated, light fastness is improved by incorporating the polyalkylenepolyamine-dicyandiamide based polycondensation products into a water non-absorptive support.

Recording Sheets-1Y through -5Y and Recording Sheets-1AY through -5AY were prepared by applying an exemplified silane coupling agent (SC-2) onto each surface of Recording Sheets-1X through -5X and Recording Sheets-1AX through -5AX so as to obtain an applied amount of 1.0 g per $m^2$ on the recording sheet. Light fastness was evaluated in the same manner as Example 1. Table 8 shows the obtained results.

TABLE 8

| | 30° C. and 50% RH | | 30° C. and 75% RH | |
|---|---|---|---|---|
| | 20 Days | 80 Days | 20 Days | 80 Days |
| 1Y | 0.94 | 0.40 | 0.83 | 0.31 |
| 2Y | 0.96 | 0.75 | 0.90 | 0.55 |
| 3Y | 0.97 | 0.80 | 0.89 | 0.61 |
| 4Y | 0.95 | 0.79 | 0.89 | 0.62 |
| 5Y | 0.94 | 0.81 | 0.88 | 0.59 |
| 1AY | 0.86 | 0.37 | 0.81 | 0.34 |
| 2AY | 0.85 | 0.39 | 0.80 | 0.32 |
| 3AY | 0.83 | 0.40 | 0.78 | 0.32 |
| 4AY | 0.86 | 0.44 | 0.77 | 0.41 |
| 5AY | 0.84 | 0.42 | 0.80 | 0.35 |

Employing ink jet printer PM770C, manufactured by Seiko-Epson Co., an image (highly detailed color digital standard image data "No. 5 Bicycle" published by Zaidan Hojin Nihon Kikaku Kyokai (Foundation, Japanese Standards Association) in December 1995, was printed onto Recording Sheets-1 through -5, -1X through -5X, and -1Y through -5Y prepared in Examples 1, 7, and 8. After immersing each of the resulting prints in 30° C. pure water for about one minute, it was subjected to natural drying.

The degree of dye bleeding to the white area in each resulting print was visually observed and was rated into four grades.

(A) Almost no bleeding traces were observed (B) Bleeding traces were observed, which hardly affected the entire image (C) Marked but only partial bleeding traces were observed (D) Marked bleeding traces were observed over the entire image Table 9 shows the obtained results.

TABLE 9

| | Example 1 | Example 7 | Example 8 |
|---|---|---|---|
| 1 | B | D | C |
| 2 | A | C | B |
| 3 | A | C | B |
| 4 | A | C | B |
| 5 | A | C | B |

From the results in Table 9, it is found that even though the cationic fixing agent is not incorporated, the water resistance is somewhat improved by the addition of the polyalkylenepolyamine based polycondensation products, but the addition of the cationic fixing agent results in more preferred water resistance.

What is claimed is:

1. An ink-jet recording sheet comprising a water non-absorptive support having thereon a porous ink absorptive layer comprising inorganic pigments, a hydrophilic binder and a dicyandiamide polycondensation product selected from the group consisting of polyalkylene-dicyandiamide polycondensation products and formalin-dicyandiamide polycondensation products, wherein a weight ratio of the inorganic pigments to the hydrophilic binder is from 2:1 to 20:1.

2. The ink-jet recording sheet of claim 1 wherein the porous ink absorptive layer further comprises a cationic fixing-agent having quaternary ammonium bases in its molecule.

3. The ink jet recording sheet of claim 2 wherein the cationic fixing-agent is a cationic polymer.

4. The ink jet recording sheet of claim 2 wherein the cationic fixing-agent is a silane coupling agent.

5. The ink-jet recording sheet of claim 1 wherein the porous ink absorptive layer further comprises boric acids or its salt.

6. The ink-jet recording sheet of claim 1 wherein the porous ink absorptive layer further comprises water-soluble polyvalent metal ion.

7. The ink-jet recording sheet of claim 1 wherein the porous ink absorptive layer further comprises a water-soluble reducing agent.

8. The ink-jet recording sheet of claim 1 wherein the porous ink absorptive layer further comprises a sulfur-containing compound.

9. The ink-jet recording sheet of claim 1 wherein the porous ink absorptive layer further comprises a hydrophobic antioxidant.

10. The ink-jet recording sheet of claim 1 wherein the porous ink absorptive layer further comprises a latex-based polymer.

11. The ink-jet recording sheet of claim 1 wherein the dicyandiamide polycondensation product is a polyalkylene-dicyandiamide polycondensation product.

12. The ink-jet recording sheet of claim 1, wherein the water non-absorptive support is a paper support which is laminated with polyethylene on both surfaces.

* * * * *